W. S. HOVEY & C. B. STEBBINS.
MOTOR CAR.
APPLICATION FILED JULY 1, 1909.
998,179.
Patented July 18, 1911.
3 SHEETS—SHEET 1.
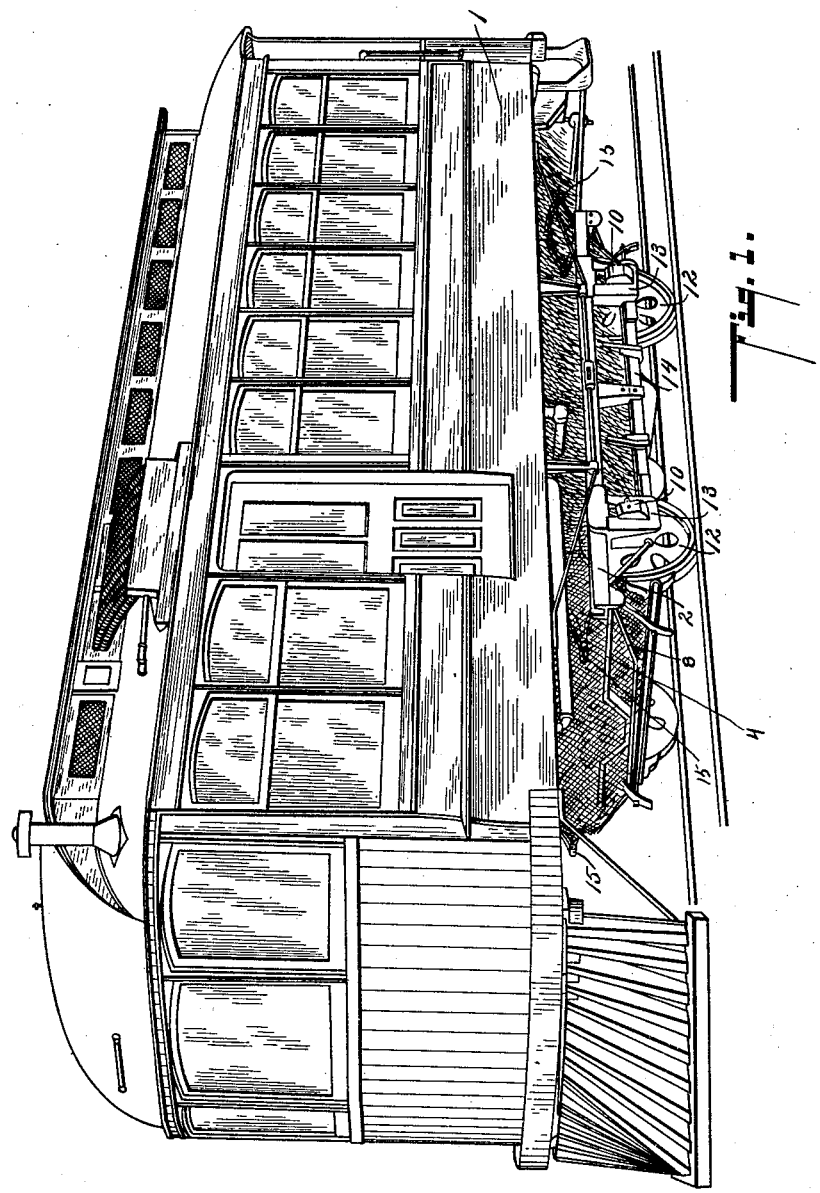

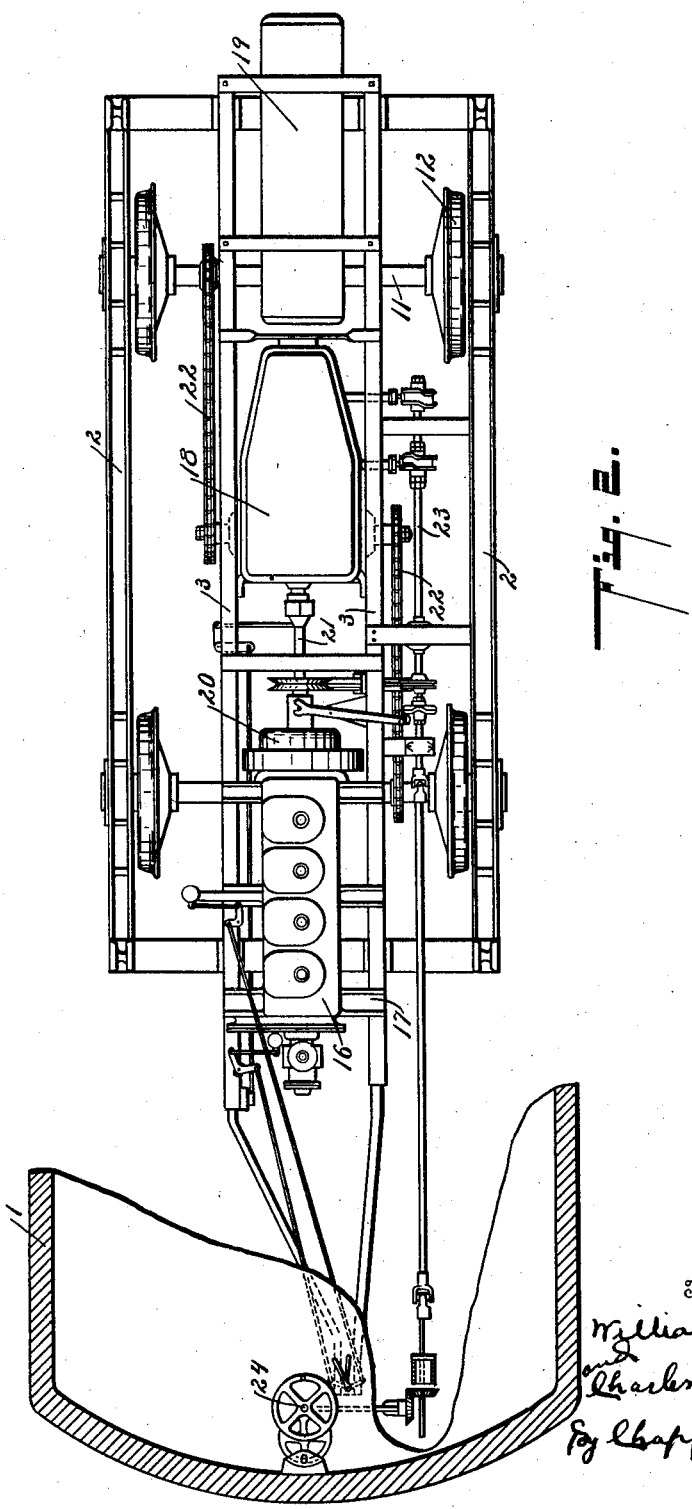

W. S. HOVEY & C. B. STEBBINS.
MOTOR CAR.
APPLICATION FILED JULY 1, 1909.
998,179.
Patented July 18, 1911.
3 SHEETS—SHEET 3.
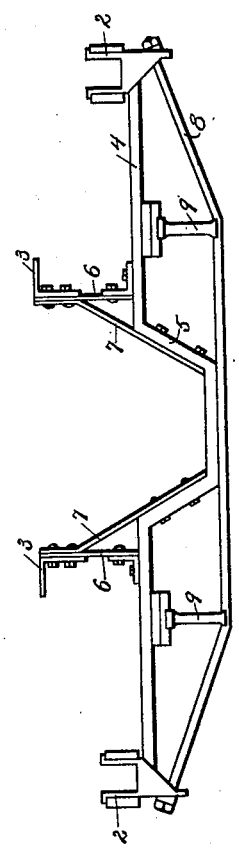
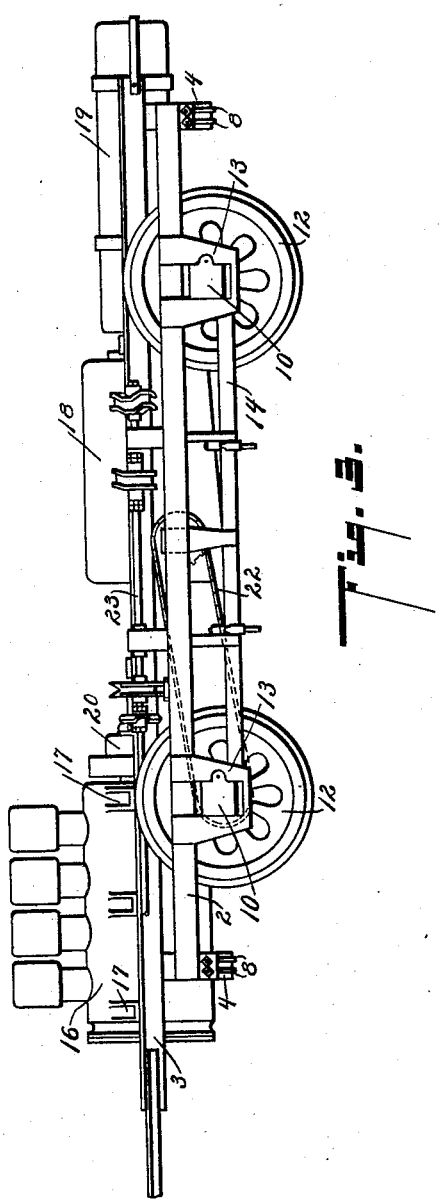

UNITED STATES PATENT OFFICE.

WILLIAM S. HOVEY AND CHARLES B. STEBBINS, OF THREE RIVERS, MICHIGAN, ASSIGNORS TO SHEFFIELD CAR COMPANY, OF THREE RIVERS, MICHIGAN.

MOTOR-CAR.

998,179. Specification of Letters Patent. Patented July 18, 1911.

Original application filed March 1, 1909, Serial No. 480,811. Divided and this application filed July 1, 1909.
Serial No. 505,378.

*To all whom it may concern:*

Be it known that we, WILLIAM S. HOVEY and CHARLES B. STEBBINS, citizens of the United States, residing at Three Rivers, Michigan, have invented certain new and useful Improvements in Motor-Cars, of which the following is a specification.

This invention relates to improvements in motor cars.

The main objects of this invention are: First, to provide an improved motor car adapted for use as a railway car, having explosion engines as driving power. Second, to provide in a motor car, an improved running gear frame.

Further objects, and objects relating to structural details, will definitely appear from the detailed description to follow.

We accomplish the objects of our invention by the devices and means described in the following specification. The structure described constitutes one effective embodiment of our invention. Other embodiments would be readily devised by those skilled in the art.

The invention is clearly defined and pointed out in the claims.

A structure constituting an effective and preferred embodiment of the features of our invention is clearly illustrated in the accompanying drawing, forming a part of this specification, in which:

Figure 1 is a perspective view of a structure embodying the features of our invention. Fig. 2 is a plan view of the running gear, a detail of the forward end of the body of the car being illustrated in connection therewith to show the relation of the parts. Fig. 3 is a side elevation of the running gear frame. Fig. 4 is an end elevation of the running gear frame.

In the drawing, similar reference characters refer to similar parts throughout the several views.

Referring to the drawing, the car body 1 illustrated is intended as a combination passenger and baggage car, and is illustrated herein merely to show the general application of the features of this invention. The running gear frame preferably consists of the outer longitudinal sills 2 and inner longitudinal sills 3, the sills 3 being primarily a support for the engine transmission, and the like. The details of the frame clearly appear in Figs. 2, 3 and 4.

The outer longitudinal sills are connected by cross-pieces 4 at each end, which are provided with yoke-like drops 5 at the center. The inner longitudinal sills 3 are supported on these cross sills by uprights 6 and the braces 7, so that the sills 3 are supported in an elevated position relative to the sills 2. Trusses 8 are provided for the cross-pieces 4, the trusses being adapted to engage the drop portion 5 of the cross-pieces, and being provided with suitable truss blocks 9, see Fig. 4.

The bearings 10 for the axles 11 of the truck wheels 12 are arranged in suitable pedestals 13. These pedestals are connected by the side bars 14. The sills and their connections are shown more or less in conventional form in the accompanying drawings, the connecting bolts or rivets, and other parts, as braces, not being illustrated. The bearing pedestals 13 are of the common or any desired type, so that the running gear frame is yieldably supported on the axles, the bearing pedestals embodying the springs, as is customary in car construction.

The car body 1 is supported upon the running gear frame by means of the springs 15, see Fig. 1. The engine 16 illustrated is of the four cylinder type and is shown in conventional form only. This engine is arranged at the forward end of the central longitudinal sills 3, it being arranged between them and provided with rests or base portions 17 resting on the top of the sills. At the rear of the engine, and also arranged between and supported by these longitudinal sills 3, is a transmission 18, while at the rear of the transmission and also arranged between and supported by the longitudinal sills 3 is a fuel storage reservoir 19.

The details of the transmission are not shown herein, but are fully described in our application for Letters Patent, Serial No.

480,811, filed March 1st, 1909, for motor cars, of which case this application is a division. The engine or crank shaft, not here illustrated, is arranged longitudinally of the running gear frame and is connected by the driving or master clutch 20 to the driving shaft 21. The details of the master clutch 20 are not here illustrated as they form no part of this invention. The shaft 21 is suitably connected to the transmission. The transmission shafts are connected through the chains 22 and suitable sprockets to the axles. The clutches of the transmission and the master clutch are controlled through the cam shaft 23. The details of the connection to the clutches, and of the cam shaft to the control post 24 are not here illustrated and described in detail, as they are fully described in the copending application referred to, in which claims are made thereto.

By this construction of the running gear frame, it is simple, and, at the same time, strong, rigid and compact which are features greatly to be desired in structures of this class, this is, four wheel railway trucks. The engine is mounted on the running gear, which is supported by the traction wheels, and the car body is mounted on the running gear frame by springs, so that the vibration of the engine is not communicated thereto, or the movement or swaying of the car-body is not communicated to the engine. Further, the arrangement of the transmission and engine upon the sills 3 maintains a perfect alinement of the parts.

We have illustrated and described our improvements in the form in which we have embodied them in practice. We are, however, aware that they are capable of considerable variation in structural details without departing from our invention, and we desire to be understood as claiming them specifically as illustrated, as well as broadly.

Having thus described our invention, what we claim as new and desire to secure by Letters Patent is:

1. In a structure of the class described, the combination with the traction wheels, of a running gear frame, comprising a pair of outer longitudinal sills, cross pieces at the front and rear thereof, said cross pieces having yoke-like central drops therein, trusses for said cross pieces, a pair of inner longitudinal sills, uprights on said cross pieces, on which said inner longitudinal sills are mounted, an engine mounted on and arranged between said inner longitudinal sills at the forward end thereof, above the forward cross piece, the crank shaft of said engine being arranged longitudinally of said frame; a transmission comprising a transmission gearing casing mounted on and arranged between said inner longitudinal sills at the rear of said engine, a driven shaft arranged transversely of said casing below said inner longitudinal sills, driving connections therefor to said traction wheels; and a storage reservoir mounted upon and arranged between said inner longitudinal sills at the rear of said transmission casing and above the rear cross piece.

2. In a structure of the class described, the combination with the traction wheels, of a running gear frame, comprising a pair of outer longitudinal sills, cross pieces at the front and rear thereof, said cross pieces having yoke-like central drops therein, trusses for said cross pieces, a pair of inner longitudinal sills, uprights on said cross pieces, on which said inner longitudinal sills are mounted, an engine mounted on and arranged between said inner longitudinal sills at the forward end thereof, above the forward cross piece, the crank shaft of said engine being arranged longitudinally of said frame; a transmission comprising a transmission gearing casing mounted on and arranged between said inner longitudinal sills at the rear of said engine, a driven shaft arranged transversely of said casing below said inner longitudinal sills, and driving connections therefor to said traction wheels.

3. In a structure of the class described, the combination with the traction wheels, of a running gear frame, comprising a pair of outer longitudinal sills, cross pieces therefor, a pair of inner longitudinal sills, uprights on said cross pieces on which said inner longitudinal sills are mounted, an engine mounted on and arranged between said inner longitudinal sills at the forward end thereof, above the forward cross-piece, the crank shaft of said engine being arranged longitudinally; a transmission comprising a transmission gearing casing mounted on and arranged between said inner longitudinal sills at the rear of said engine, a driven shaft arranged transversely of said casing, driving connections therefor to said traction wheels; and a storage reservoir mounted upon and arranged between said inner longitudinal sills at the rear of said transmission casing.

4. In a structure of the class described, the combination with the traction wheels, of a running gear frame, comprising a pair of longitudinal sills, a cross piece having a yoke-like central drop therein, a pair of inner longitudinal sills mounted on said cross piece, one at each side of said central drop thereof, an engine mounted on and arranged between said inner longitudinal sills at the forward end thereof, above the forward cross piece, the crank shaft of said engine being arranged longitudinally; a transmission comprising a transmission gearing casing mounted on and arranged between said inner longitudinal sills at the rear of said engine, a driven shaft arranged transversely of said casing, and driving connections therefor to said traction wheels.

In witness whereof, we have hereunto set our hands and seals in the presence of two witnesses.

WILLIAM S. HOVEY. [L. S.]
CHARLES B. STEBBINS. [L. S.]

Witnesses:
E. J. GODSHALK,
D. C. MIX.

Copies of this patent may be obtained for five cents each, by addressing the "Commissioner of Patents, Washington, D. C."